United States Patent [19]

Toriselli et al.

[11] Patent Number: 5,215,138
[45] Date of Patent: Jun. 1, 1993

[54] BEAD RELEASE UNIT OF HIGHLY VERSATILE APPLICATION

[75] Inventors: Franco Toriselli; Giuliano Crotti; Marco Crotti; Tiziana Iotti, all of Correggio, Italy

[73] Assignee: Societa' Italiana Costruzioni Eletromeccaniche - S.I.C.E. S.P.A., Correggio, Italy

[21] Appl. No.: 877,426

[22] Filed: May 1, 1992

[30] Foreign Application Priority Data

May 3, 1991 [IT] Italy ............. RE91 A 00029

[51] Int. Cl.⁵ ............................................. B60C 25/06
[52] U.S. Cl. .................................... 157/1.17; 157/1.26
[58] Field of Search ................. 157/1.17, 1.2, 1.22, 157/1.24, 1.26, 1.28; 269/45, 71; 81/177.75, 177.7, 177.8, 177.9

[56] References Cited

U.S. PATENT DOCUMENTS 3,130,772  4/1964  Young .
4,884,611  12/1989  Schmidt ..................... 157/1.24

FOREIGN PATENT DOCUMENTS 0015102  2/1980  European Pat. Off. .

Primary Examiner—D. S. Meislin

[57] ABSTRACT

A bead release unit comprises an arm (1) which at one end carries a bead release tool consisting of a curved plate body, whereas at its other end it is intended to be hinged to a supporting structure so that it can rotate between two positions in which it positions said tool respectively distant from and in contact with the tire of a wheel (wheel rim+tire) resting against a locator. The tool (6) is supported by said arm (1) by way of an articulated joint comprising two coplanar pins (8), (9) connected together, of which the first (8) is arranged transverse to the generating lines of said tool to enable this latter to rotate within a plane perpendicular to the plane of rotation of the arm (1), whereas the second (9) is substantially parallel to the generating lines of the tool to enable this latter to rotate within a plane transverse both to the plane of rotation of the arm and to the plane of rotation of the tool about said first pin.

7 Claims, 5 Drawing Sheets

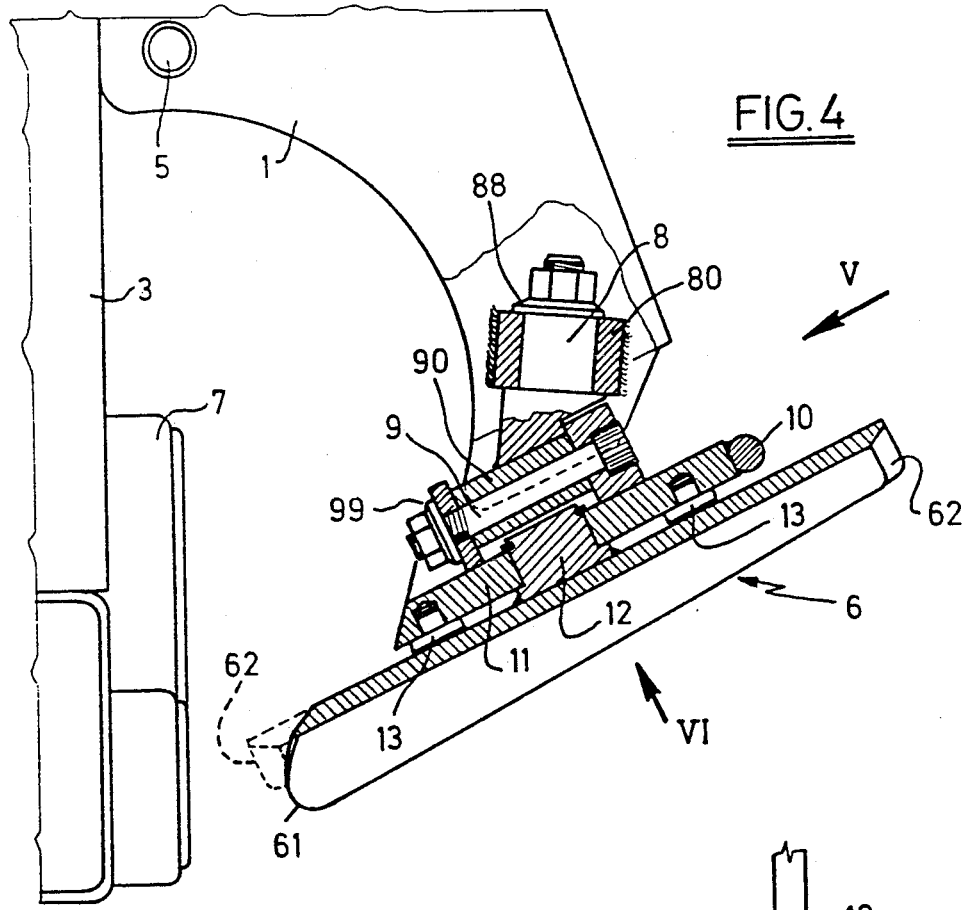
FIG. 4
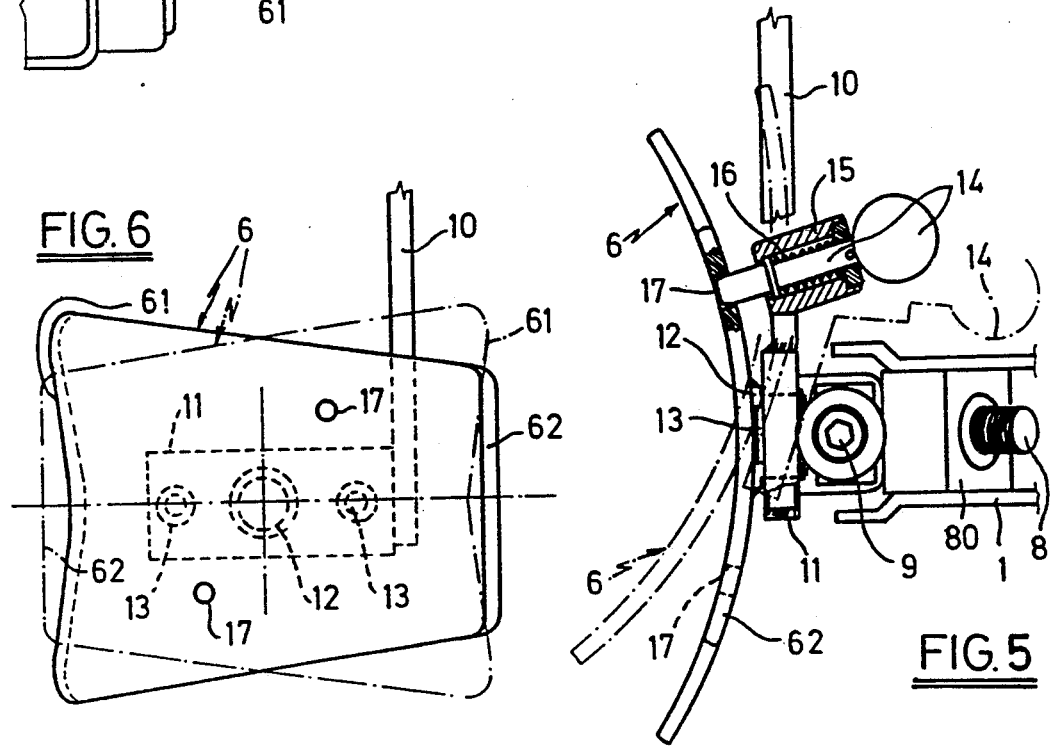
FIG. 6
FIG. 5

BEAD RELEASE UNIT OF HIGHLY VERSATILE APPLICATION

This invention relates to a bead release unit typically but not exclusively for tire removal machines in general.

More precisely the invention relates to a bead release unit of highly versatile application, or in other words of universal type in the sense that it is able to operate on practically the entire range of currently available tires, with particular but not exclusive reference to tires for light vehicles such as automobiles, motorcycles, light trucks and vans, off-the-road vehicles and the like.

For removing and mounting wheels from and onto their respective wheel rims it is known to use suitable tire removal machines, which will not be described in detail herein. Before removing a tire from its wheel rim its beads have to be released, i.e. separated from the respective bead-holding edges of the wheel rim, in order to allow the removal tools to be inserted between said beads and the wheel rim.

For said bead release, bead release devices are known either in the form of an independent unit or machine, i.e. designed for bead release and separate from other units or machines operating on the wheel (rim+tire), or associated with another unit or machine such as a tire removal machine. Consequently, for total clarity of interpretation it should be noted that the bead release unit of the invention can be either associated or not associated with a tire removal machine in the aforesaid sense, although hereinafter for ease and clarity of description reference will be made exclusively to bead release devices associated with respective tire removal machines.

Tire removal machines are for example known provided with a bead release device comprising a horizontal lateral arm which is hinged at one end to the tire removal machine on a vertical rear axis, while at its other end it comprises a bead release tool commonly known as a blade.

A pneumatic cylinder-piston unit is interposed between the base of the tire removal machine and said arm, which can rotate between a rest position in which the blade is distant from said base, and a working position in which the blade is in contact with the bead to be separated, its wheel rim resting against said base. Said blade consists of a plate-like metal body shaped as a portion of a cylindrical surface the axis of which extends horizontally, and is moved towards the front operating region of the tire removal machine. With reference to that stated in the introduction, this latter situation represents a particular but not exhaustive application of a known bead release device to a likewise known tire removal machine, so that the relative positions of the respective component elements are to be considered as referring to the aforegoing example.

In all cases the blade of known bead release devices, whether associated with a tire removal machine or not, is hinged at one end of said arm on an axis substantially parallel to the longitudinal axis of the ideal cylindrical surface containing the blade, the active (or bead release) edge of the blade having a slightly concave profile.

The widespread use of such known bead release devices has highlighted the following problems.

Said problems derive from the fact that the dimensions and characteristics of currently used tires and wheel rims differ considerably, with the result that it often happens that known bead release devices encounter great difficulty in separating the beads of certain tire types, and in some cases they are unable to do so.

Briefly, and without considering the tire width, i.e. that tire dimension parallel to the axis of the wheel (rim+tire), tires are currently available for mounting on:

A—wheel rims with a nominal diameter (across their projecting edges) substantially of between 10 and 20 inches;

B—wheel rims (typically intended for high performance automobiles) provided at the attachment base of their bead-holding edges, or more precisely on their projecting edges, with circumferential grooves or ribs, the former receiving the inner circumferential edges of the beads of the respective tires, while the latter engage conjugate channels formed in said inner circumferential bead edges, the purpose of said grooves or ribs being to prevent the beads becoming accidentally dislodged, for example when the vehicle is travelling with an insufficiently inflated or punctured tire; and C—wheel rims (particularly of light or ultra-light alloy, and typically intended for vehicles of a certain value) which are particularly costly and delicate and for which there is a high probability of damage and/or breakage. Typically said damage or breakage derives from rubbing against or impact with pavements, curbs, traffic islands and the like. To at least partly obviate such situations, the tires usually mounted on such wheel rims comprise on at least one side a strong circumferential ridge concentric to the wheel axis, its purpose being to protect or safeguard the outer part or boundary of the wheel rim. Specifically, said tire ridge extends beyond said rim outer part or boundary, and that edge of said ridge which faces the wheel axis lies a short distance from and faces that edge of the wheel rim which faces outwards from said wheel axis.

Again, on said wheel rims of different nominal diameter (described under point A above) it is known to mount tires having considerably different side wall or shoulder heights.

The problem therefore exists of rapidly, correctly and comfortably releasing the beads of all said types of tires associated with the previously described wheel rim types, taking account of the fact that several of the aforelisted characteristics can apply during a bead release operation, and also considering that very often the beads are tightly attached (and practically bonded) to the respective bead-holding edges.

In known bead release devices the curvature of the blade and the length of its active edge are particularly suitable for wheel rims of usual diameter, i.e. a diameter the average of the aforesaid range, whereas they are unsuitable for those wheel rims with a diameter close to the maximum or minimum values of the range.

This is because during bead release of tires mounted on wheel rims of relatively small or relatively large diameter, the blade acts on the bead to be released only with the end part of its active edge, whereas the remaining part of this latter lies beyond the bead and hence acts on the tire side wall, which is much less resistant than the bead. For these reasons the bead release of said tires (on wheel rims of relatively small or large diameter) is particularly difficult, and it is often necessary to operate several times on the same bead portion. It is obvious that this is also true, in terms of the aforesaid dimension characteristics (of the wheel rim and tire), for wheels (rim+tire) having an outer diameter (across the tread) which is relatively small or large considering both the nominal wheel rim diameter and the height of the tire side wall or shoulder.

Furthermore, it can happen and has in fact happened that the tire suffers damage by that part of the blade which comes into contact with its side wall, especially when the bead is tightly attached to the bead-holding edge, and/or when the bead is contained in a circumferential groove in the wheel rim, or is engaged with a circumferential rib on the rim, as stated heretofore. In such situations it can sometimes happen that the blade is unable to release the beads.

In addition, known bead release devices suffer from substantially the same aforesaid problems when releasing the beads of the aforementioned tires with circumferential edge-protecting ridges.

In these cases the bead release can succeed only if the active edge of the blade acts on that part of the bead between the outer edge of the wheel rim and said circumferential ridge, or even on this latter, beyond which the force exerted by the blade is ineffective in addition to being damaging to the tire.

Known bead release devices have proved unsuitable for, and sometimes incapable of, operating in the aforesaid situations not only for the stated reasons but also because their blade cannot be sufficiently adjusted relative to their support arm and hence relative to the wheel rim (or tire).

In an attempt to obviate this, the applicant has previously devised a bead release unit in which the blade support arm possesses a further degree of freedom.

Specifically, between said support arm and the corresponding pivot pin a shaft is interposed transversely to said pin to enable said arm to rotate in a plane transverse to the plane of rotation defined by said pin, with said shaft there being associated means (such as a screw clamp) able to lock the arm in any position between its end-of-rotation positions about said shaft.

This construction, although having proved satisfactory with regard to the aforesaid problems, is inconvenient in that it comprises a large number of component parts and is hence constructionally complicated and costly.

Consequently in this specific sector there is a considerable requirement for a bead release unit which obviates the aforesaid problems.

The main object of the present invention is to satisfy this requirement, within the context of a simple and reliable construction which is of versatile use.

Said object is attained by the invention as defined in the accompanying claims.

The characteristics and constructional merits of the invention will be apparent from the detailed description given hereinafter with reference to the accompanying figures, which illustrate four preferred embodiments thereof by way of non-limiting example.

FIG. 1A shows to an enlarged scale the encircled detail A of FIG. 1.

FIG. 4 is a partial view from above similar to that of FIG. 1, showing a second embodiment of the invention.

FIGS. 5 and 6 are two views taken in the directions V and VI of FIG. 4 respectively.

Figure 1:
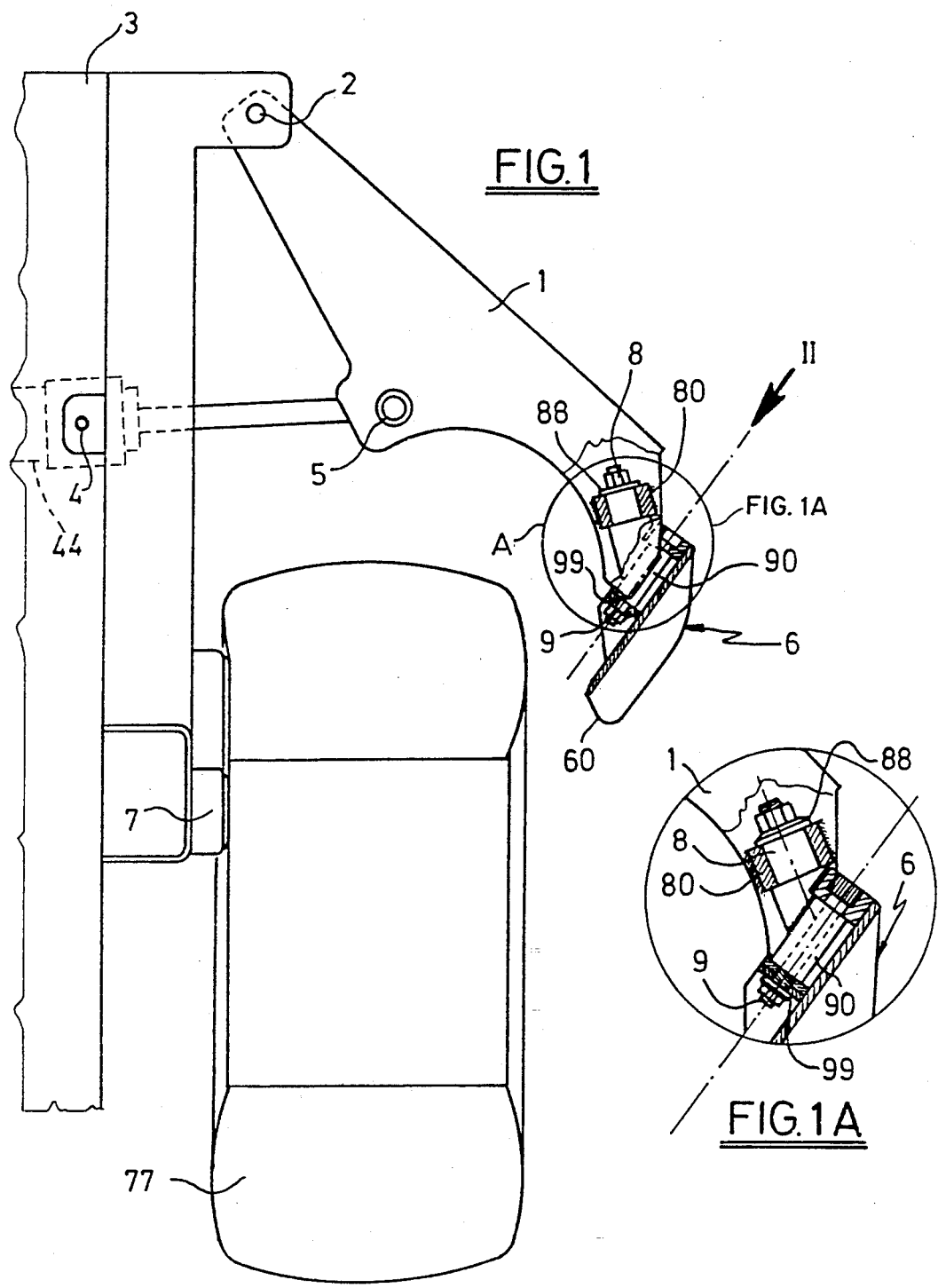
FIG. 1 is a partly sectional view from above showing a first embodiment of the invention associated with a tire removal machine.

Said figures, and in particular FIG. 1, show a shaped arm 1 of box type hinged on a vertical axis 2 to the side of the base or frame 3 of a tire removal machine.

This latter is not shown in detail as it can be of any known type and because it does not constitute a characterising part of the invention. As stated in the introduction, the arm 1 can be associated with a structure other than the base of a tire removal machine.

Said base 3 houses a pneumatic cylinder-piston unit 44 (FIG. 1) which is hinged to the base 3 on a vertical axis 4, its rod being connected to the arm 1 at an intermediate point 5.

On the front end of the arm 1 there is a bead release tool 6 or blade, which faces a locator 7 fixed to the front side of the base and against which the wheel 77 (wheel rim + tire) from which the beads are to be released rests.

According to the invention, said blade 6 is fixed to the front end of the arm 1 by way of a cross-type articulated joint, which is described in detail hereinafter.

It should be noted that all the illustrated embodiments comprise said cross-type articulated joint.

As can be seen in FIGS. 1, 1A, 2, 4, 5, 7, 8, 10 and 11, this latter comprises a horizontal pin 8 rotatably mounted in a conjugate seat formed in a block 80, and put under friction by a cup spring 88.

The block 80 is fixed to the arm 1, the front end of the pin 8 being fixed to a bush 90 in which a pin 9 is rotatably mounted, put under friction by a cup spring 99. The two pins 8 and 9 are coplanar, the blade 6 being fixed to the opposing ends of the pin 9 by way of respective rear lugs.

The blade is provided at its rear with a usual projecting rear lever 10 by which the blade 6 can be rotated about said pins 8 and 9. With specific reference to FIG. 4, in which the arm 1 is shown in its completely closed position and with the blade 6 in as straight position, said two pins 8, 9 define an obtuse angle with its opening facing the base 3 of the tire removal machine.

More specifically, and again with reference to the closed position of said arm 1, the longitudinal axis of the pin 8 is virtually parallel to the facing side of the base 3, whereas the longitudinal axis of the pin 9 is slightly inclined to a horizontal straight line perpendicular to said side.

Specifically, said pin 9 is parallel to the generatrix or generating line of the curved blade 6, whereas the pin 8 lies transversely to this generatrix.

In other words, the bead release tool has a plate body curved about an axis wherein the pin (9) lies parallel to the axis and the pin (8) lies transverse to the axis.

Figure 2:
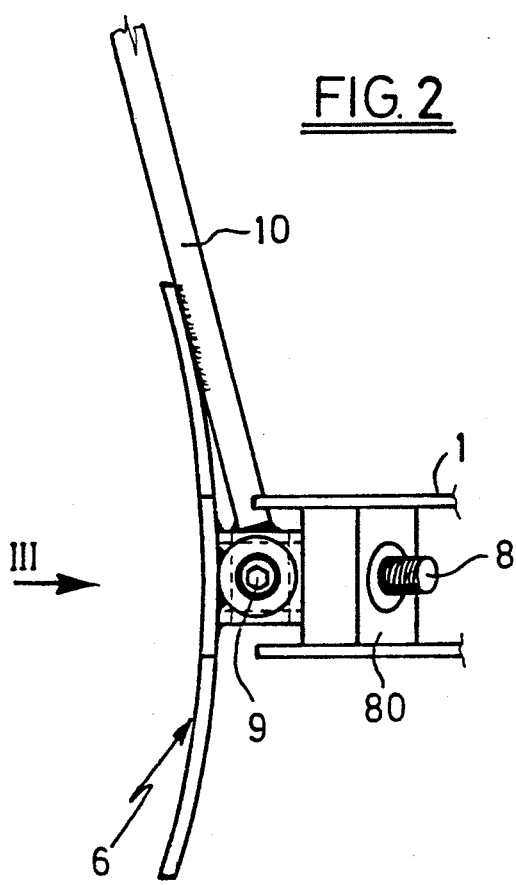
FIGS. 2 and 3 are two partial views to an enlarged scale taken in the directions II and III of FIGS. 1 and 2 respectively.
Figure 3:
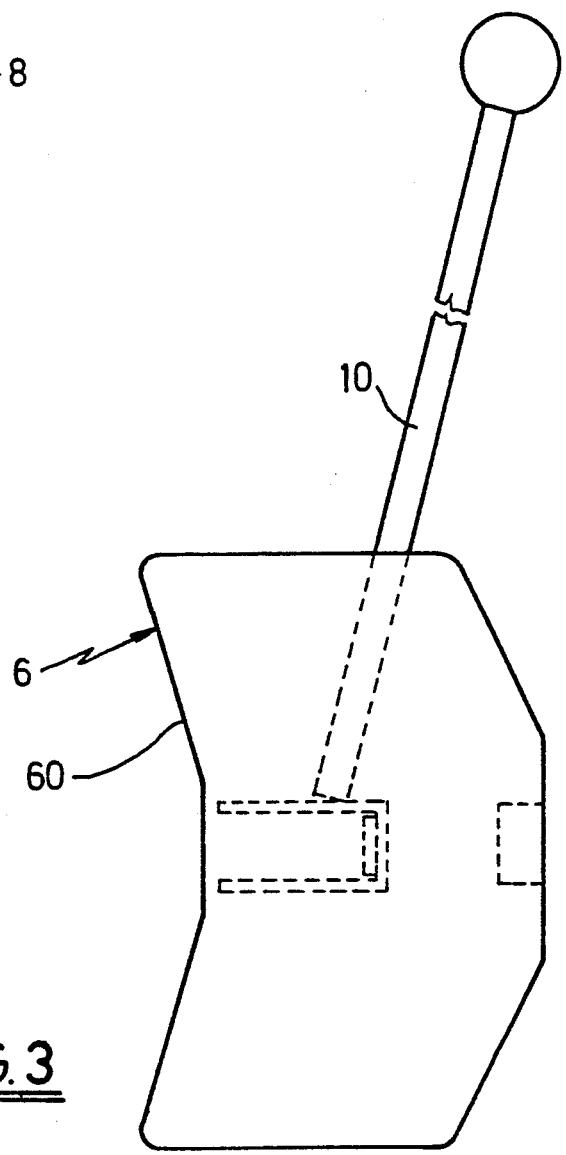

As can be seen from FIGS. 1 to 3, the blade 6 shown therein is of usual type and consists of a plate-like metal body (FIGS. 1, 2) substantially of lunette shape (FIG. 3), and consisting of a cylindrical surface portion extending about a horizontal axis positioned towards the front region of the tire removal machine (FIG. 1). In addition, the active edge of the blade 6, indicated by 60 in the figures, is of usual concave form (FIG. 3) and is suitably bevelled (FIG. 1).

By virtue of said cross-type articulated joint 8-9, the blade 6 although of usual type can be used more effectively, more easily and more correctly than in the case of the known art.

This is apparent from the problems discussed in the introduction, in particular (but not exclusively) with reference to those tires and wheel rims having said circumferential ridge, for which bead release is possible only if the active edge of the blade is practically exactly inserted between said ridge and the outer edge of the wheel rim.

In addition, said cross-type articulated joint enables the active edge 60 of the blade 6 to be positioned more accurately for those beads which are difficult to release either because they are tightly attached to the respective bead-holding edges or because they are held in circumferential grooves provided in the projecting edges of the wheel rim, or again because they are engaged with circumferential ribs provided on said projecting edges.

The versatility of the bead release device according to the invention is further increased in the embodiments shown in FIGS. 4 to 12.

In the embodiment shown in FIGS. 4 to 6, the blade 6 consists of a plate-like body shaped as a cylindrical surface portion (FIGS. 4, 5) and having the shape of a truncated isosceles triangle in front view (FIG. 6).

The major base of said shape is slightly concave, whereas its minor base is straight, said two bases defining two active edges or bead release profiles, these being indicated by 61 and 62 respectively and being conveniently bevelled as shown in FIGS. 4 and 6.

Said two active edges can obviously satisfy different bead release problems or requirements, for example the active edge 62 is more suitable than the edge 61 for bead release of:

tires associated with wheel rims with grooves or ribs provided on their projecting walls for protection against accidental bead release;

tires having at least one lateral circumferential ridge for safeguarding the outer lateral region of the corresponding wheel rim, as stated; and motorcycle tires.

At this point it is apparent that the blade 6 of FIGS. 4 to 6 can be provided with more than two active edges, which can be easily selected by simply rotating the blade 6 within the plane in which it lies, by virtue of the following described means.

Said means comprise an attachment plate 11 which is parallel to the pin 9, by which it is supported, and is able to rotate about the axis defined by this latter (FIGS. 4, 5), and in addition supports the lever 10 (FIG. 4). A horizontal pin 12 branching from the rear central region of the blade 6 is mounted, rotatable but axially locked, at the centre of said plate 11 in a manner perpendicular to the pin 9 and coplanar with it.

Transverse stability of the blade 6 is provided by two disc-shaped retainers 13 on one and the other side of the pin 12 (FIG. 4) between said plate 11 and blade 6.

Finally, the blade 6 is torsionally locked by a latch 14 slidingly mounted within an inclined bush 15 fixed on top of the plate 11.

Said bush 15 houses a compressed spring 16 mounted about the latch 14 in such a manner as to constantly force it into its forward locking position (FIG. 5), the front end of said latch 14 emerging from said bush 16 to be received in one of the two holes 17 provided in the blade 6.

As can be seen in FIG. 6, said two holes 17 are positioned antisymmetrically about the longitudinal axis of the blade 6 (or height of its isosceles trapezium-shaped front).

Figure 7:
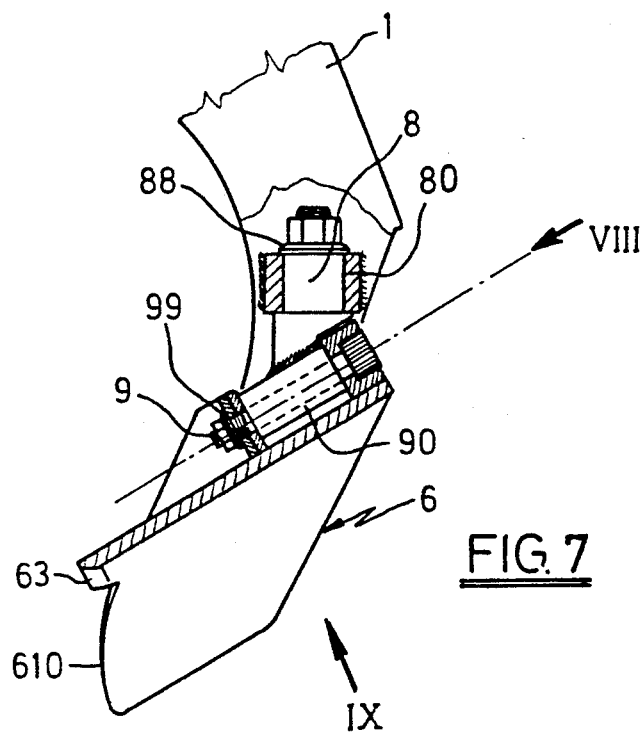
FIG. 7 is a partial view from above similar to those of FIGS. 1 and 4, showing a third embodiment of the invention.
Figure 8:
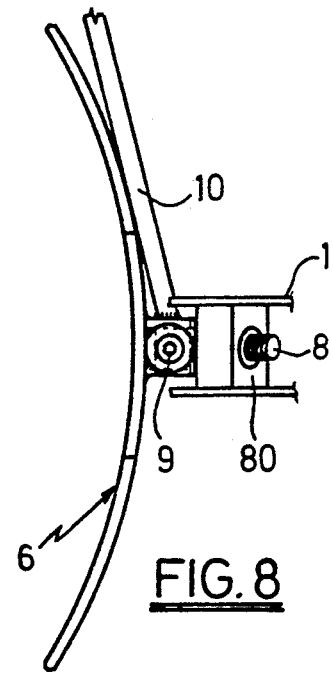
FIGS. 8 and 9 are two views to a smaller scale taken in the directions VIII and IX of FIG. 7 respectively.
Figure 9:
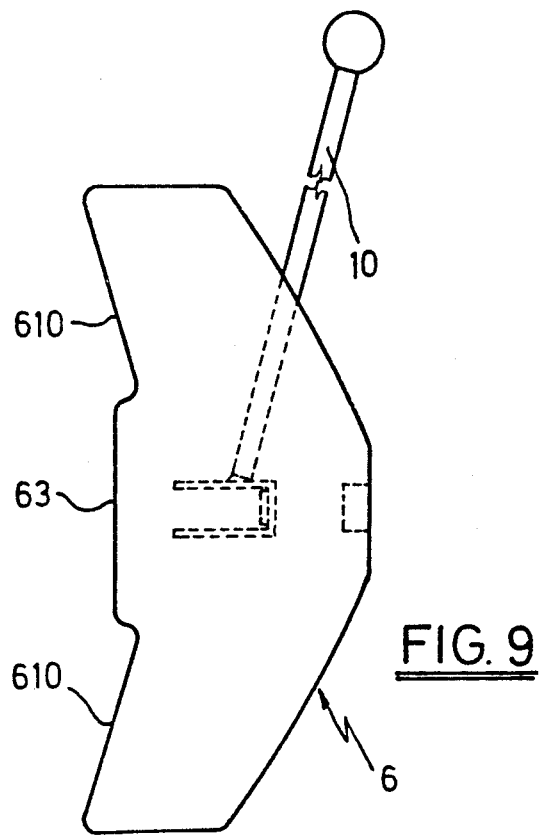

In the embodiment of FIGS. 7 to 9, the blade 6 shown therein is of usual concave form (FIGS. 7, 8), whereas its active profile 610, also of overall concave form (FIG. 9), is provided centrally with a projecting portion 63 the free end of which is straight and lies transverse to the pin 9 (and to the generatrix of the blade 6), as can be seen in FIG. 7.

This latter blade 6 is particularly convenient for releasing beads which are particularly difficult to detach, particularly those engaged with grooves or ribs for protection against bead release provided on the projecting edges of the respective wheel rim.

This is because the blade 6 shaped in the stated manner acts progressively, in the sense that firstly it releases (or removes from said groove or rib) that bead portion contacted by said projecting part 63, after which the release of the two bead portions contacted by the profile 610 presents practically no problem seeing that in most cases the bead is completely released by a single operation.

Figure 10:
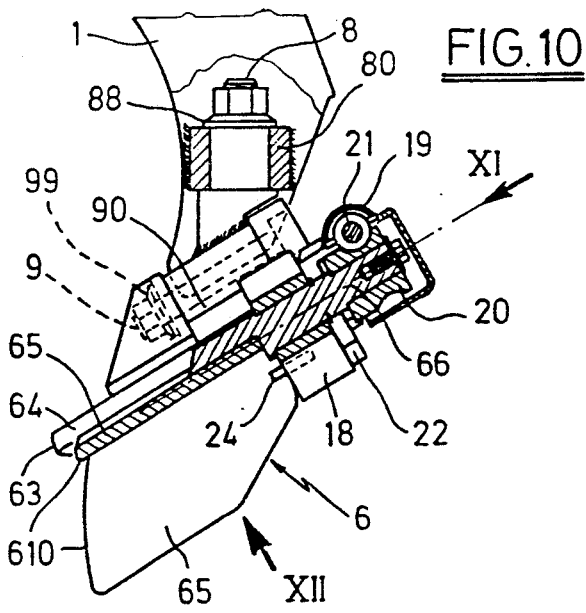
FIG. 10 is a partial view from above similar to those of FIGS. 1, 4 and 7, showing a fourth embodiment of the invention.
Figure 12:
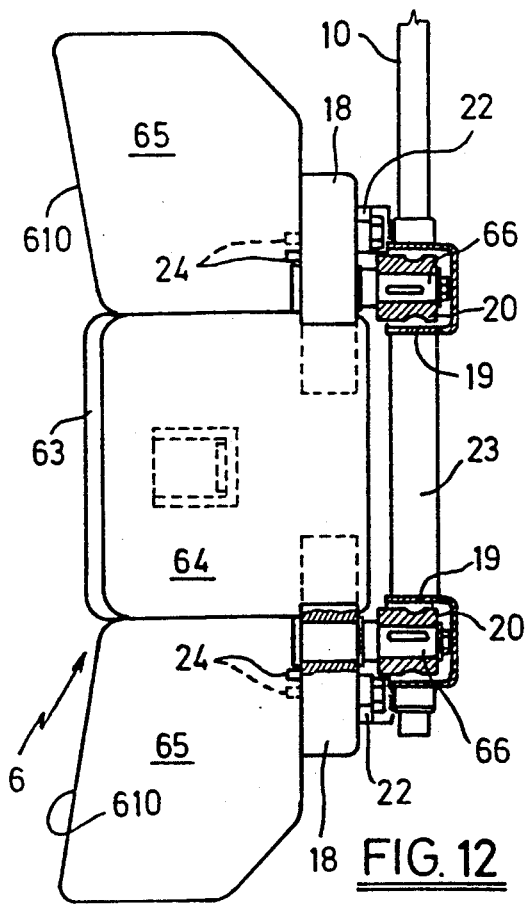
FIGS. 11 and 12 are two views taken in the directions XI and XII of FIG. 10, FIG. 12 being to a smaller scale.
Figure 11:
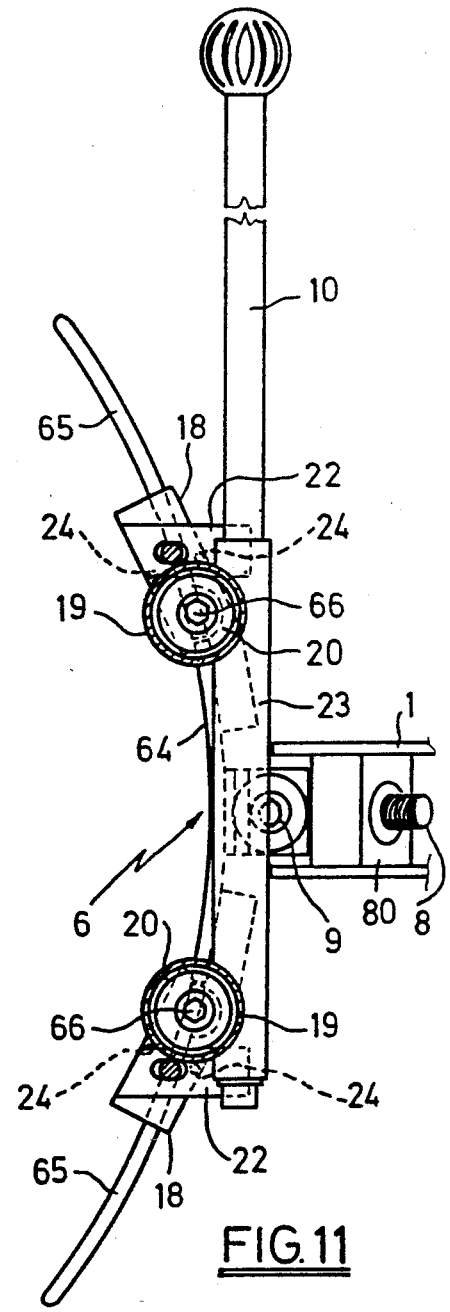

In the embodiment shown in FIGS. 10 to 12, in which the active profile of the blade 6 again comprises a projecting central portion 63 and two opposing portions 610, of which the former 63 is associated with a central arched plate 64, while the other two 610 are associated respectively with an upper and a lower arched plate 65 (FIGS. 10 to 12).

The central plate 64 is supported by the pin 9 in the already described and illustrated manner, whereas the two plates 65 are hinged to the preceding 64 on respective pins 66 lying parallel to the axis of said pin 9 and parallel to the generatrix of the central plate 64, in the following manner. Each pin 66 is rotatably mounted, but axially locked (FIG. 10), on a shaped support 18 fixed behind the central plate 64 at the opposite end to the edge 63.

The pin 66 extends into a housing 19 where it carries fixed to it a worm wheel 20 (FIGS. 10, 11), this latter engaging a corresponding thread portion 21 (FIG. 10) formed on the shaft of the lever 10.

The two housing 19 are supported by respective brackets 22 fixed to the supports 18, and are connected together by a tube 23 in which the shaft of the lever 10 is rotatably mounted but axially locked.

It is apparent that the two thread portions 21 of this latter are opposite-handed, as it is also apparent that the threaded portions 21 can be associated with a rod other than the lever 10.

Basically, said elements 21 and 20 form two worm screw-worm wheel linkages by means of which, on rotating the lever 10 about itself, the two plates 65 are made to rotate with simultaneous identical but opposite rotation relative to the central plate 64. In this manner the average radius of the curve (FIG. 11) defined by said three plates 64 and 65 can be selected, to adapt it to the radius of the rim of the wheel currently undergoing bead release.

Finally, the range of rotation of each plate 65 is defined by two pegs 24 (FIGS. 10, 12) fixed to the respective support 18 on one and the other side of said plate 65. The versatility of application of the embodiment of the invention described with reference to FIGS. 10 to 12 is apparent, especially in the light of that already stated with reference to the other embodiments.

It will merely be stated that because of the facility for rotating the plates 65 about the central plate 64, and the presence of the cross-type articulated joint 8-9, the blade 6 can operate correctly on tires mounted on wheel rims of any known diameter, and/or on tires of different side wall or shoulder heights mounted on any one size of wheel rim.

This is because the curvature of the blade 6 can be varied as stated and hence adapted to the diameter of the wheel subjected to bead release.

It should also be noted that again with the blade of the embodiment shown in FIGS. 10 to 12, progressive bead release is obtained as previously specified with reference to the embodiment of FIGS. 7 to 9. A further advantage common to both these embodiments (FIGS. 7 to 12) is that the thrust provided by the bead release cylinder-piston unit is initially discharged onto a bead portion of small width (defined by the profile 63), followed by a much wider bead portion (profiles 610 and 63).

In this manner the blade 6 is much more effective because the thrust of the bead release cylinder-piston unit is concentrated precisely within the initial (more difficult) stage of bead release, and is more widely distributed, and hence more softly acting, during the next stage in which the blade encounters less resistance.

Because of this, complete bead release is often achieved with a single operation.

Again, because of said progressive action a lower pressure and a less powerful bead release cylinder-piston unit than those required for usual or traditional bead release devices can be used.

The invention is not limited to that illustrated and described, but covers all technical equivalents to the described means and their combinations, if implemented within the context of the following claims.

We claim:

1. A bead release unit typically for tire removal machine comprising:
    an arm (1),
    a bead release tool (6) having a curved about on axis plate body and being carried at one end of said arm,
    a supporting structure having a locator (7) fixed thereto,
    said arm having its other end hinged to said supporting structure so that said arm can rotate in a plane of rotation between two positions namely, a rest position and a working position to position said tool respectively distant from and in contact with the tire mounted on a wheel resting against said locator,
    said bead release tool (6) being supported by said arm (1) by an articulated joint comprising first and second coplanar pins (8,9) connected together,
    said first coplanar pin (8) being arranged transverse to said axis to enable said bead release tool to rotate within a plane perpendicular to said plane of rotation of said arm (1), and
    said second coplanar pin (9) being substantially parallel to said axis to enable said bead release tool to rotate within a plane transverse both to the plane of rotation of the arm and to the plane of rotation of said bead release tool about said first coplanar pin (8).

2. A unit as claimed in claim 1, wherein said bead release tool (6) is rotatably mounted to said articulated joint by a central rear pin (12) fixed to said bead release tool (6) and said bead release tool has at least two bead release profiles (61), (62) of different lengths located on said tool so that one or the other of said at least two bead release profiles can be arranged in a correct bead release position, and locking means (14) for securing said bead release tool in position relative to said articulated joint.

3. A unit as claimed in claim 2, characterized in that said central rear pin (12) fixed to said tool (6) is moutned, rotatable but axially locked, on a support plate (11) which is hinged to said second pin (9) about which said tool (6) rotates, said central rear pin (12) being perpendicular to and coplanar with said second pin (9), said locking means (14) consisting of a latch mounted on said plate (11) and at least two retention seats (17) provided in said tool (6).

4. A unit as claimed in claim 1, characterized in that said tool (6) has a bead release profile comprising two opposing virtually straight inclined portions (610) which converge towards a base of a projecting central portion (63), a substantially straight free edge of said base lies transverse to said axis.

5. A unit as claimed in claim 1, characterized in that said bead release tool (6) comprises a central arched plate (64) and two identical opposing arched plates (65), said central arched plate (64) has a projecting portion (63) as part of a bead release profile, and said opposing arched plates (65) provide two inclined portions (610) converging towards said projecting central portion (63), said two identical opposing arched plates (65) being hinged to the corresponding edges of said central arched plate (64) so that the overall curvature of the tool (6) can be varied.

6. A unit as claimed in claim 5, characterized in that said two opposing arched plates (65) are adjusted relative to said central plate (64) by respective threaded linkage means, each of said threaded linkage means including a worm wheel (20) which is fixed to a rotatable pin (66) and a worm screw (21) for turning said worm wheel, and means for hinging each of said opposing plates (65) to the central plate (64), each said means for hinging including said rotatable pin (66).

7. A unit as claimed in claim 6, characterized in that the worm screw (21) of each said threaded linkage means is formed on a lever (10) for positioning and adjusting the blade (6).

* * * * *